United States Patent [19]
Korpi et al.

[11] Patent Number: 5,898,924
[45] Date of Patent: Apr. 27, 1999

[54] METHOD FOR CONNECTION HANDLING IN COMMUNICATION SYSTEMS WITH WIRELESS SIGNAL TRANSMISSION

[75] Inventors: Marku Korpi, Starnberg, Germany; Ernst Langmantel; Helmut Stiglbrunner, both of Vienna, Austria; Wilhelm Mueller, Woerth, Germany

[73] Assignee: Siemens Aktiengesellschaft, Munich, Germany

[21] Appl. No.: 08/575,101

[22] Filed: Dec. 19, 1995

[30]     Foreign Application Priority Data

Dec. 30, 1994 [DE]  Germany ............... 44 47 243

[51] Int. Cl.⁶ .................................................. H04Q 7/20
[52] U.S. Cl. ............................................. 455/437; 455/442
[58] Field of Search ................................. 455/436–438, 455/442, 452, 462, 440, 443, 444

[56]         References Cited

U.S. PATENT DOCUMENTS

| | | | |
|---|---|---|---|
| 5,101,501 | 3/1992 | Gilhousen et al. | 455/437 |
| 5,117,502 | 5/1992 | Onoda et al. | 455/437 |
| 5,267,261 | 11/1993 | Blakeney et al. | 455/437 |
| 5,303,289 | 4/1994 | Quinn | 455/436 |
| 5,444,766 | 8/1995 | Farwell et al. | 455/437 |
| 5,590,177 | 12/1996 | Vilmur et al. | 455/436 |
| 5,649,000 | 7/1997 | Lee et al. | 455/436 |

FOREIGN PATENT DOCUMENTS

| | | |
|---|---|---|
| 0 509 548 A2 | 10/1992 | European Pat. Off. . |
| 682 867 A5 | 11/1993 | Germany . |

OTHER PUBLICATIONS

DECT–Standard ETS 300 175–1 bis ETS 300 175–11.

*Primary Examiner*—Dwayne D. Bost
*Assistant Examiner*—Tracy M. Legree
*Attorney, Agent, or Firm*—Hill & Simpson

[57]        ABSTRACT

A method for the implementation of a connection handover initiated by a cordless terminal equipment in Detect systems with modified standard: After the signaling of the call setup request signal "Connection Hand Over Request", the mobile part also immediately transmits the user data in the newly captured channel. After reception of the "Connection HO Request" forwarded by the newly selected base station, reception in the switching node can therefore be immediately switched thereto (without a gap in the user data transmission). In the transmission direction, the switching equipment can transmit in parallel via both base stations until, for example, an acknowledgment is received from the new base station with respect to the error-free signal output of "Bearer Confirm", or until the mobile part clears down the previous connection.

9 Claims, 2 Drawing Sheets

METHOD FOR CONNECTION HANDLING IN COMMUNICATION SYSTEMS WITH WIRELESS SIGNAL TRANSMISSION

BACKGROUND OF THE INVENTION

The invention is directed to a method for clearing down a connection existing between a cordless terminal equipment and a switching equipment via a first base station and for simultaneously setting up a connection between this cordless terminal equipment and the switching equipment via a second base station, i.e. the handover of an existing connection from a first to a second base station. What is to be understood by this handover is what is referred to as a "connection handover" defined by the ETSI in the DECT Standard ETS 300 175-1 through ETS 300 175-11, particularly in ETS 300 175-4:1992, Chapter 9.2.7.3.

Such methods are implemented in communications systems having at least one switching equipment for setting up and clearing down connections between communication terminal equipment, whereby user information in the form of user signals can be respectively transmitted between the switching equipment and the communication terminal equipment within a connection, and the switching equipment can receive and output user signals transmitted in wire-bound fashion. A respective plurality of base stations connected to the switching equipment is provided in such communication systems in order to convert user signals transmittable in wire-bound fashion into wirelessly transmittable user signals, in order to output these user signals onto one of a plurality of selectable channels and in order to convert wirelessly transmittable user signals into user signals transmittable in wire-bound fashion. The base stations, called "Radio Fixed Part" (RFP) according to DECT, thus enable the realization of connections between communications terminal equipment designed as cordless terminal equipment (KES) that wirelessly transmit and receive signals, also called a mobile part, and the switching equipment.

The afore-mentioned DECT Standard provides that a cordless terminal equipment (mobile part) connected to the switching equipment via a first base station sends a "Connection Hand Over Request" to a second base station for initiating a connection setup between this mobile part and the switching equipment via this second base station. According to the DECT Standard, the mobile part must make B-channel data available, i.e. must send user signals to the second base station as soon as it has received a signal "Bearer Confirm" from this base station. At this point in time, B-channel data from the switching equipment are also available via this base station. Immediately after receipt of "Bearer Confirm", the mobile part must switch the reception to the second base station because it is defined in the DECT Standard that the previous connection can be cleared down at the system side after the error-free transmission of "Bearer Confirm", namely without signalization-wise release at the air interface between the base station and the mobile part (ETS 300 175-4:1992, Chapter 9.2.7.3). In the standardized connection handover, the previous connection is cleared down by the mobile part as per definition.

Whereas it is set down in the DECT Standard that responses to signalizations between mobile parts and base stations are to be assured within approximately five milliseconds by radio via the air interface, the corresponding response times between base stations and switching nodes are usually ten to a hundred times longer. Consequently, there is no exact information on hand in the switching node about the point in time at which a base station selected for a new connection sends the message "Bearer Confirm" to the corresponding mobile part, or respectively this mobile part receives said message. The selection of the point in time at which, given "connection handover", the user data reception should be switched from the previous base station to the new base station in the switching equipment is consequently problematical.

When the reception to user data in the switching equipment is immediately switched to the new base station after the switching equipment initiates the parallel transmission of the user data to both participating base stations, user data will not yet be made available by the mobile part via the new base station. When, by contrast, the switching equipment switches the user data reception over to the new base station only after receiving an acknowledgment of the new base station regarding the error-free transmission of the message "Bearer Confirm", then, as a reaction to "Bearer Confirm", the mobile part can, due to the longer signaling running time of the wire-bound transmission, have ended the transmission of user information via the original base station before the arrival of the acknowledgment message in the switching equipment and, thus, before a certain time span before the switching of the reception at the switching side.

In both described instances, a gap occurs within the user data transmission. When the user data are a matter of voice signals, then the seamless handover from one base station to the next described in the DECT Standard is not assured. In data transmission, certain data sequences drop out in the call handover, so that corresponding communication equipment can be used for data transmission only in conjunction with an involved error monitoring system.

SUMMARY OF THE INVENTION

It is an object of the present invention to specify a method that assures a connection set up and clear down of the type between a mobile part and a switching equipment via different base stations without losses of user data.

According to the invention, in a communication system a method is provided for clearing down a connection existing via a first base station between a cordless terminal equipment and a switching equipment and for simultaneously setting up a connection via a second base station between the cordless terminal equipment and the switching equipment in what is known as a connection handover. With the switching equipment, connections are set up and cleared down between the cordless terminal equipment. Useful information is respectively transmitted between the switching equipment and the cordless terminal equipment in the form of user signals within a connection. The switching equipment receives an output user signals transmitted in wire-bound fashion. The first and second base stations are connected to the switching equipment for converting user signals transmitted in wire-bound fashion into wirelessly transmitted user signals, for outputting these user signals onto one of a plurality of selectable channels, and for converting wirelessly transmitted user signals into user signals transmitted in wire-bound fashion in order to enable a connection between the communication terminal equipment that receives and transmits wireless signals and the switching equipment. With the cordless terminal equipment connected to the switching equipment via the first base station, transmitting a call setup request signal as a connection handover request to the second base station for initiating a connection setup between the cordless terminal equipment and the switching equipment via the second base station. After outputting the call setup request signal, transmitting from the cordless terminal equipment user signals to the first base station and to the second base station in parallel via user channels, independently of a reception of an acknowledgment signal following thereupon.

According to the invention, the mobile part initiating the connection clear down and connection setup also sends the user data in the newly captured channel immediately after the signaling of the connection setup request signal "Connection Hand Over Request".

What is thereby achieved is that the reception direction in the switching node can be immediately switched to the newly selected base station after reception of the connection setup request signal "Connection HO Request" forwarded from the newly selected base station, without a gap possibly occurring in the user data transmission. In the transmission direction, the switching equipment can transmit in parallel via both base stations until, for example, an acknowledgment message of the new base station about the error-free signal output of "Bearer Confirm" is received, or until the mobile part clears down the previous connection.

DESCRIPTION OF THE PREFERRED EMBODIMENTS

Figure 1:
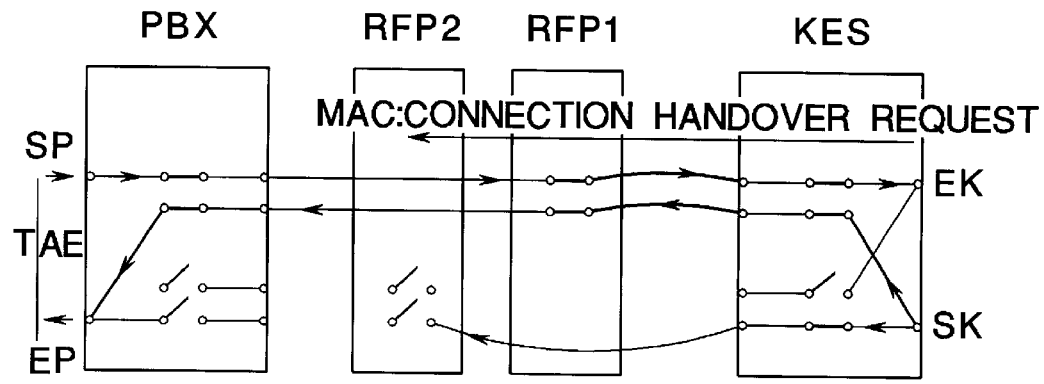
FIGS. 1–5 show various statuses of the B-channel in the sequence FIG. 2, FIG. 1, FIG. 3, FIG. 4 and FIG. 5 during and after a "connection handover" event according to the invention, as well as the signaling in layer 2 (according to the OSI reference model) preceding the respective status.
Figure 2:
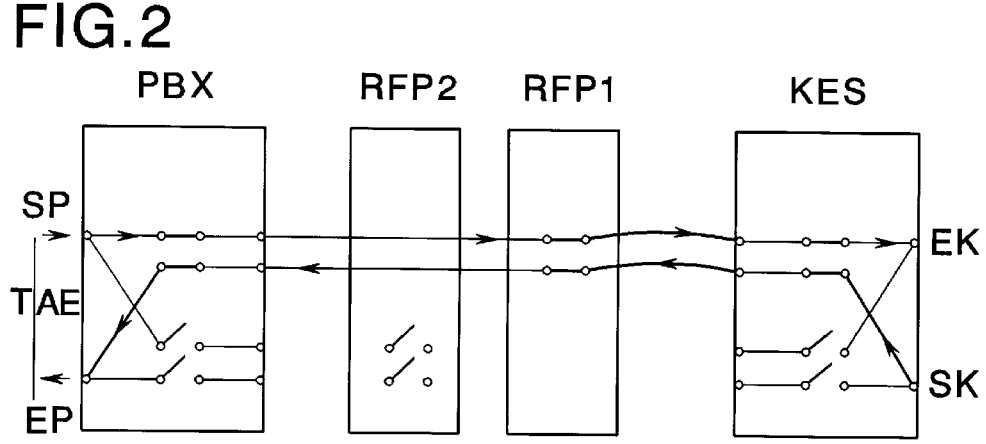

FIGS. 1 through 5 show the block illustration of an arrangement composed of a switching equipment PBX, of a first base station RFP1 (Radio Fixed Part), of a second base station RFP2, of a cordless terminal equipment KES and of a subscriber line unit TAE provided at the switching equipment PBX. FIG. 2 thereby shows the initial B-channel condition, namely that a B-channel is through-connected in a transmission direction from a terminal SP for the transmission signal outgoing from a subscriber line unit TAE via the first base station RFP1 to a terminal EK that edits the received signal for further-processing in the cordless terminal equipment KES, and that a B-channel is through-connected from the transmission terminal SK in the cordless terminal equipment KES via the first base station RFP1 and the switching equipment PBX to a terminal EP that edits the reception signal for the subscriber line unit TAE. For initiating a method of the invention, as shown in FIG. 1, the signaling message Connection handover Request is transmitted from the cordless terminal equipment KES to the second base station RFP2 in the MAC layer (Medium Access Control), this being equivalent to an inquiry of the cordless terminal equipment KES at the second base station RFP2 for the allocation of a broadcast channel. Further, a user channel connection to the second base station RFP2 is set up from the terminal SK of the cordless terminal equipment KES, so that the information offered at the terminal SK of the cordless terminal equipment are transmitted in parallel to the first base station RFP1 and to the second base station RFP2.

Figure 3:
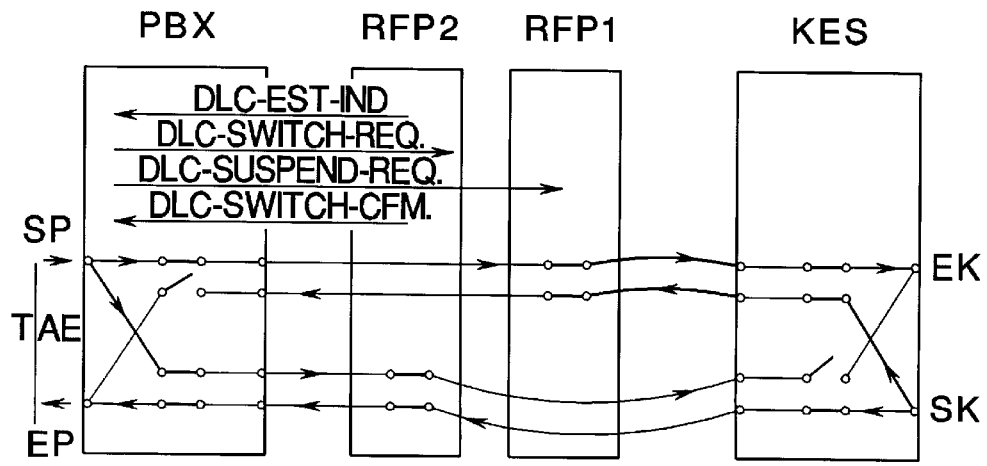

As may be seen in FIG. 3, the second base station RFP2 transmits the inquiry for allocation of a new channel DLC-Est-ind to the switching equipment PBX as a signaling message. In response thereto, the switching equipment PBX informs the second base station RFP2 with the signaling message DLC-Switch-req that this second base station can through-connect the user channel connection in both directions. With the message DLC-Switch-cfm, the second base station RFP2 informs the switching equipment PBX that it has through-connected the user channels in both directions. After the transmission and confirmation of the aforementioned messages, a user channel connection exists from the switching equipment PBX to the cordless terminal equipment KES via the first base station RFP1. and a user channel connection exists from the cordless terminal equipment KES to the switching equipment PBX via the second base station RFP2, as may be derived from the lower half of FIG. 3. The connection from the first base station RFP1 to the receiving terminal EP of the subscriber line unit TAE is no longer through-connected within the switching equipment PBX. Accordingly, the reception for the terminal EP of the subscriber line unit TAE has been switched from the first base station RFP1 to the second base station RFP2 within the switching equipment PBX at this point in time.

Figure 4:
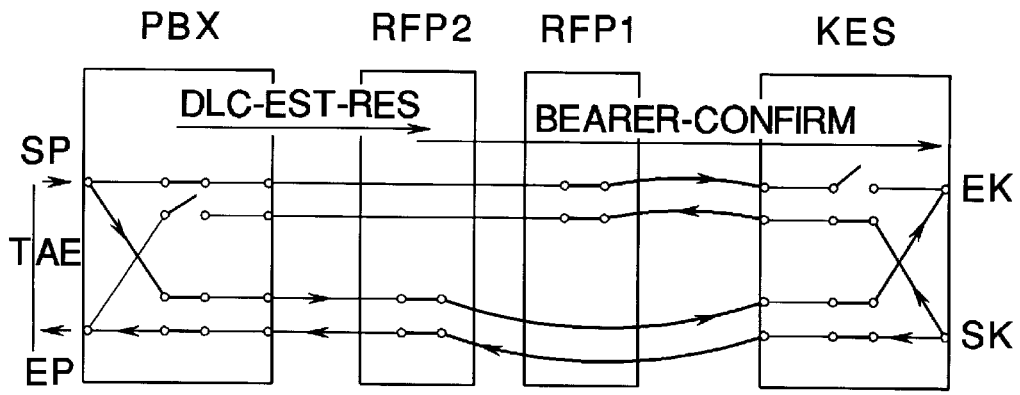

As may be derived from FIG. 4, the switching equipment PBX forwards a status acknowledgment message DLC-Est-res to the second base station RFP2 in order to confirm that the reception has been switched to the second base station RFP2 in the switching equipment PBX. Following thereupon, the second base station RFP2 outputs an acknowledgment message Bearerconfirm to the cordless terminal equipment KES in the MAS layer and thereby confirms that the second base station RFP2 is available for a connection to the switching equipment PBX.

In conformity with the DECT Standard, the cordless terminal equipment KES switches the receive-side connection from the first base station RFP1 to the second base station RFP2 immediately after the reception of the acknowledgment signal Bearerconfirm sent from the second base station RFP2. FIG. 4 shows this status wherein the user channel connection has been undertaken via the second base station RFP2 both in the transmission as well as in the reception direction.

Figure 5:
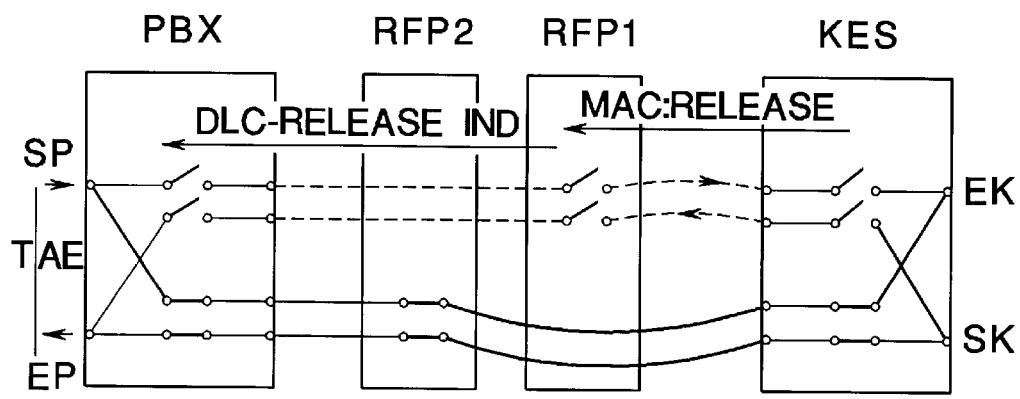

As may be seen from FIG. 5, the cordless terminal equipment KES then outputs the signaling message Release to the first base station RFP1 in the MAC layer in order to initiate the clear down of the connection from the cordless terminal equipment KES to the first base station RFP1. The first base station RFP1 forwards a signaling message DLC-Release-ind to the switching equipment PBX for clearing down the connection between the first base station RFP1 and the switching equipment PBX. As shown in the lower half of FIG. 5, the connection between the switching equipment PBX, the first base station RFP1 and the cordless terminal equipment KES is subsequently cleared down in both directions. The user channel status in FIG. 5 thus corresponds to the status shown in FIG. 2, but with a connection via the second base station RFP2 instead of via the first base station RFP1.

Figure 6:
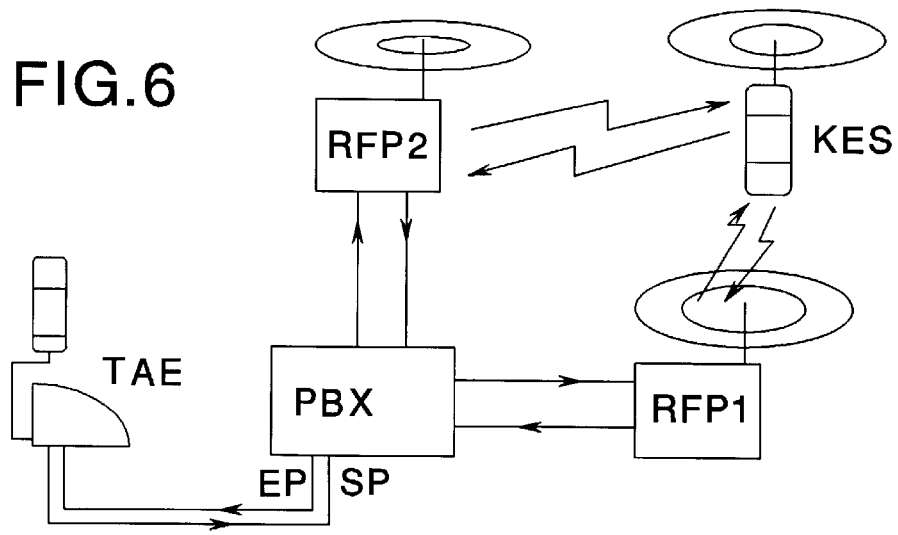
FIG. 6 is a communication arrangement for the implementation of a method of the invention.

FIG. 6 schematically shows the bidirectional possibilities of connections between a switching equipment PBX that can enter into line-bound communication with two base stations RFP1 and RFP2 as well as with a subscriber line unit TAE. A standard telephone set is shown as subscriber line equipment TAE in the example of FIG. 6. Of course, some other communication equipment such as, for example, a facsimile device, a data terminal means or the like or, on the other hand, a cordless terminal equipment can also be connected instead of a standard telephone set. As may also be derived from FIG. 6, a bidirectional wireless connection can be respectively realized between the cordless terminal equipment KES and the first base station RFP1 as well as between the cordless terminal equipment KES and the second base station RFP2.

Although various minor changes and modifications might be proposed by those skilled in the art, it will be understood that our wish is to include within the claims of the patent warranted hereon all such changes and modifications as reasonably come within our contribution to the art.

We claim as our invention:

1. A method in a communication system for clearing down a connection existing via a first base station between a cordless terminal equipment and a switching equipment and for simultaneously setting up a connection via a second base station between the cordless terminal equipment and the switching equipment in what is known as a connection handover, comprising the steps of:

with the switching equipment, setting up and clearing down connections between the cordless terminal equipment, user information being respectively transmitted between the switching equipment and the cordless terminal equipment in the form of user signals within a connection, and the switching equipment receiving and transmitting the user signals in wire-bound fashion;

the first and second base stations being connected to the switching equipment for converting the user signals transmitted in wire-bound fashion into wirelessly transmitted user signals, for outputting these user signals onto one of a plurality of selectable channels, and for converting wirelessly transmitted user signals into user signals transmitted in wire-bound fashion in order to enable a connection between the communication terminal equipment that receives and transmits wireless signals and the switching equipment;

with the cordless terminal equipment connected to the switching equipment via the first base station, transmitting from the cordless terminal equipment a call setup request signal as a connection handover request to the second base station for initiating a connection setup between the cordless terminal equipment and the switching equipment via the second base station; and after outputting the call setup request signal from the cordless terminal equipment, transmitting from the cordless terminal equipment user signals to the first base station and to the second base station in parallel via user channels, prior to a reception of an acknowledgment signal following the call setup request signal.

2. A method according to claim 1, wherein:

after receipt of the call setup request signal, the second base station communicates a corresponding message to the switching equipment;

in response thereto, transmitting with the switching equipment user signals to the first base station and to the second base station in parallel via user channels and switching the reception at the switching equipment side from the connection via the first base station to the connection via the second base station;

in response thereto, switching the reception at the terminal equipment side from the connection via the first base station to the connection via the second base station, and ending with the cordless terminal equipment parallel transmission;

ending parallel transmission with the switching equipment; and clearing down the connection via the first base station.

3. A method according to claim 1 wherein following the parallel transmission of the cordless terminal equipment to the first and to the second base station, the second base station converts the received user signals and transmits them to the switching equipment, and the switching of reception in the switching equipment then follows thereupon.

4. A method according to claim 1 wherein, after receipt of an acknowledgment message from the second base station, the cordless terminal equipment switches reception from the connection via the first base station onto the connection via the second base station.

5. A method according to claim 4 wherein the acknowledgment message is output by the switching equipment to the cordless terminal equipment after the switching equipment switching of reception.

6. The method according to claim 1 wherein said acknowledgment signal is received by said cordless terminal equipment unit independently of and after transmitting from the cordless terminal equipment said user signals to said first base station and to said second base station in parallel via said user channels.

7. The method according to claim 6 wherein said acknowledgment signal is sent by said second base station to said cordless terminal equipment unit in response to said switching equipment unit sending an acknowledgment signal to said second base station.

8. A method in a communication system for clearing down a connection existing via a first base station between a cordless terminal equipment and a switching equipment and for simultaneously setting up a connection via a second base station between the cordless terminal equipment and the switching equipment in what is known as a connection handover, comprising the steps of:

with the switching equipment, setting up and clearing down connections between the cordless terminal equipment, user information being respectively transmitted between the switching equipment and the cordless terminal equipment in the form of user signals within a connection, and the switching equipment receiving and transmitting the user signals in wire-bound fashion;

the first and second base stations being connected to the switching equipment for converting the user signals transmitted in wire-bound fashion into wirelessly transmitted user signals, for outputting these user signals onto one of a plurality of selectable channels, and for converting wirelessly transmitted user signals into user signals transmitted in wire-bound fashion in order to enable a connection between the communication terminal equipment that receives and transmits wireless signals and the switching equipment;

with the cordless terminal equipment connected to the switching equipment via the first base station, transmitting from the cordless terminal equipment a call setup request signal as a connection handover request to the second base station for initiating a connection setup between the cordless terminal equipment and the switching equipment via the second base station; and after outputting the call setup request signal from the cordless terminal equipment, transmitting from the cordless terminal equipment user signals to the first base station and to the second base station in parallel via user channels, independently of and prior to a reception by the cordless terminal equipment unit of an acknowledgment signal from the second base station following the call setup request signal.

9. The method according to claim 8 wherein said acknowledgment signal is sent by said second base station to said cordless terminal equipment after an acknowledgment signal is received by said second base station transmitted from said switching equipment.

* * * * *